S. Boyden.
Forming Bats.
No. 26,811.   Patented Jan. 10, 1860.
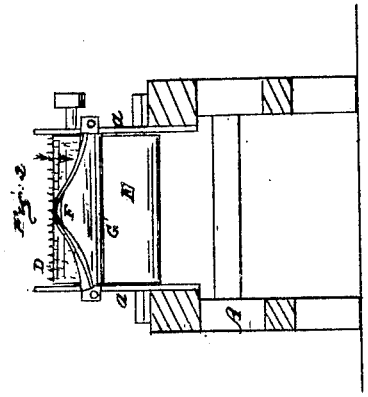
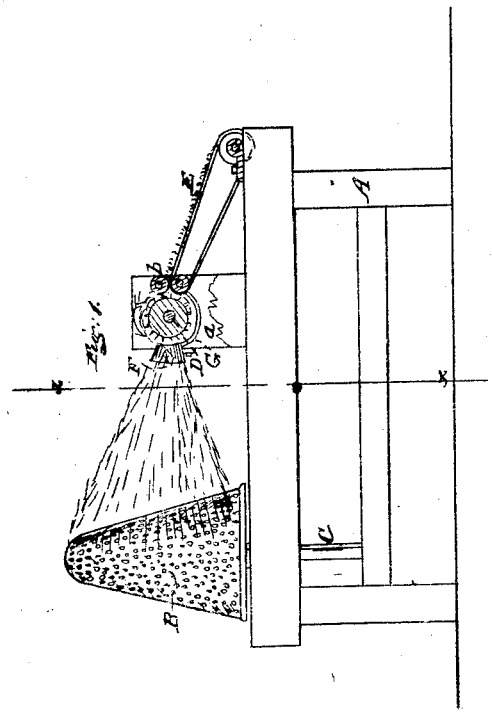
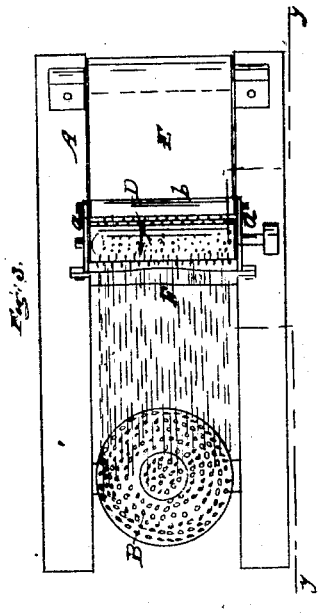
Witnesses:
Inventor.
Seth Boyden

UNITED STATES PATENT OFFICE.

SETH BOYDEN, OF NEWARK, NEW JERSEY, ASSIGNOR TO HIMSELF AND H. H. JAQUES, OF SAME PLACE.

MACHINERY FOR FORMING HAT-BODIES.

Specification of Letters Patent No. 26,811, dated January 10, 1860.

*To all whom it may concern:*

Be it known that I, SETH BOYDEN, of Newark, in the county of Essex and State of New Jersey, have invented a new and useful Improvement in Machinery for Forming Hat-Bodies; and I do hereby declare that the following is a full, clear, and exact description of the same, reference being had to the annexed drawings, making a part of this specification, in which—

Figure 1, is a side sectional view of my invention, taken in the line *y, y* Fig. 3. Fig. 2, a transverse vertical section of ditto, taken in the line *x, x*, Fig. 1. Fig. 3, a plan or top view of ditto.

Similar letters of reference indicate corresponding parts in the several figures.

This invention relates to an improved mode of directing or guiding the fur to the cone, as hereinafter fully shown and described, whereby trunks and all other comparatively complicated appliances hitherto used for the purpose are dispensed with, and an exceedingly simple and efficient device substituted therefor.

The invention consists in placing directly in front of the picker a plate so bent or curved that its surface will have a certain relative position with the axis of the picker and the surface of the cone, and give such a direction to the fur, as the latter is thrown on it by the rapid motion of the picker, that the fur will be drawn properly on the cone by the exhaust or suction within it.

To enable those skilled in the art to fully understand and construct my invention I will proceed to describe it.

A, represents a rectangular frame and B, is a perforated cone placed on a shaft C, fitted vertically in the frame, and arranged with a suitable exhaust fan.

D, is a picker fitted between suitable uprights *a, a,* on the frame and having in front of it an endless feed apron E, over the inner part of which a roller *b*, is placed. The perforated cone with an exhaust fan below it, the picker D, and feed apron E, are old devices, in common use, and therefore do not require a minute description.

At the inner or back parts of the uprights *a, a,* there is a curved plate F, and below the picker there is a concave G, the plate and concave are connected together. The plate F, is parallel with and directly back of the picker D, and in close proximity to it, and said plate is curved so as to have its highest point at the center, as shown clearly in Fig. 2. The plate gradually curves downward and outward at each side of its center with a slightly concave form as shown in the figure just alluded to. This plate F, besides the longitudinal curvature above described, is curved transversely corresponding with the surface of the cone B, as follows: The highest and central part of the plate F, has its surface in line or in a plane which bisects longitudinally the axis of the picker D, and strikes the apex of the cone; and the surface of said plate F, at each side of its center and highest point is formed of portions of planes which bisect longitudinally the axis of the picker and points on the cone extending down to its base. This gives what may be termed a compound curvature to the plate, one being longitudinal and the other transverse.

The position of the planes above described is shown by the red dotted lines in Fig. 1. It will be seen by referring to this fiure that they all extend from the axis of the picker and strike the cone at points extending from its apex to its base.

The picker D, although of usual construction is rotated in a reverse direction to those in ordinary machines. The arrow indicates the direction of its movement. The fur from which the hat bodies are formed is placed on the apron E, which conveys it as usual to the picker D. The picker by its rapid rotation conveys the fur around on the plate F, which, in consequence of being curved as described, causes the fur to be projected toward the cone B, in a series of planes extending from its apex to the base, the exhaust or suction within the cone drawing the fur on it after the proper direction has been given the fur by the plate F, the velocity of the picker being sufficiently great to project the fur within the influence of the exhaust of the cone. The concave G, permits any fur that might escape down between the plate F, and picker to be brought up by the latter and again projected on the plate F.

This peculiar curvature of the plate F, not only gives the proper direction to the fur so that the latter may properly cover the cone but, it also directs the fur to the cone in proper quantity, for instance, the central and highest part of plate F, is comparatively a short curve and directs a small quantity of fur to the upper part of the cone where but a small portion is required; but it will be seen that the lower part of the plate F, has a double curved surface to supply the cone, one at each side of its center, so that the cone will be properly fed or supplied, the supply gradually increasing from the top to the bottom of the cone.

I would remark that although the surface of the plate F, has been described as being in planes extending from the apex to the base of the cone and all bisecting the axis of the picker, still a slight departure is made from this rule, and that is the plate F is slightly elevated at its outer edges or toward the cone from the positions above stated in order to compensate for gravity, the latter serving to counteract in a measure the power of the exhaust and that of the picker and give a downward movement to the fur. By slightly elevating the direction of the fur above its otherwise proper path, due provision is made for such a contingency.

I do not claim the cone, nor the picker, neither do I claim the feed apron, but, I do claim as new and desire to secure by Letters Patent—

The fur director or plate F, curved or bent substantially as shown, and arranged in relation with the cone B, and picker D, to operate substantially as and for the purpose set forth.

SETH BOYDEN.

Witnesses:
J. W. COOMBS,
R. S. SPENCER.